Figure 1:
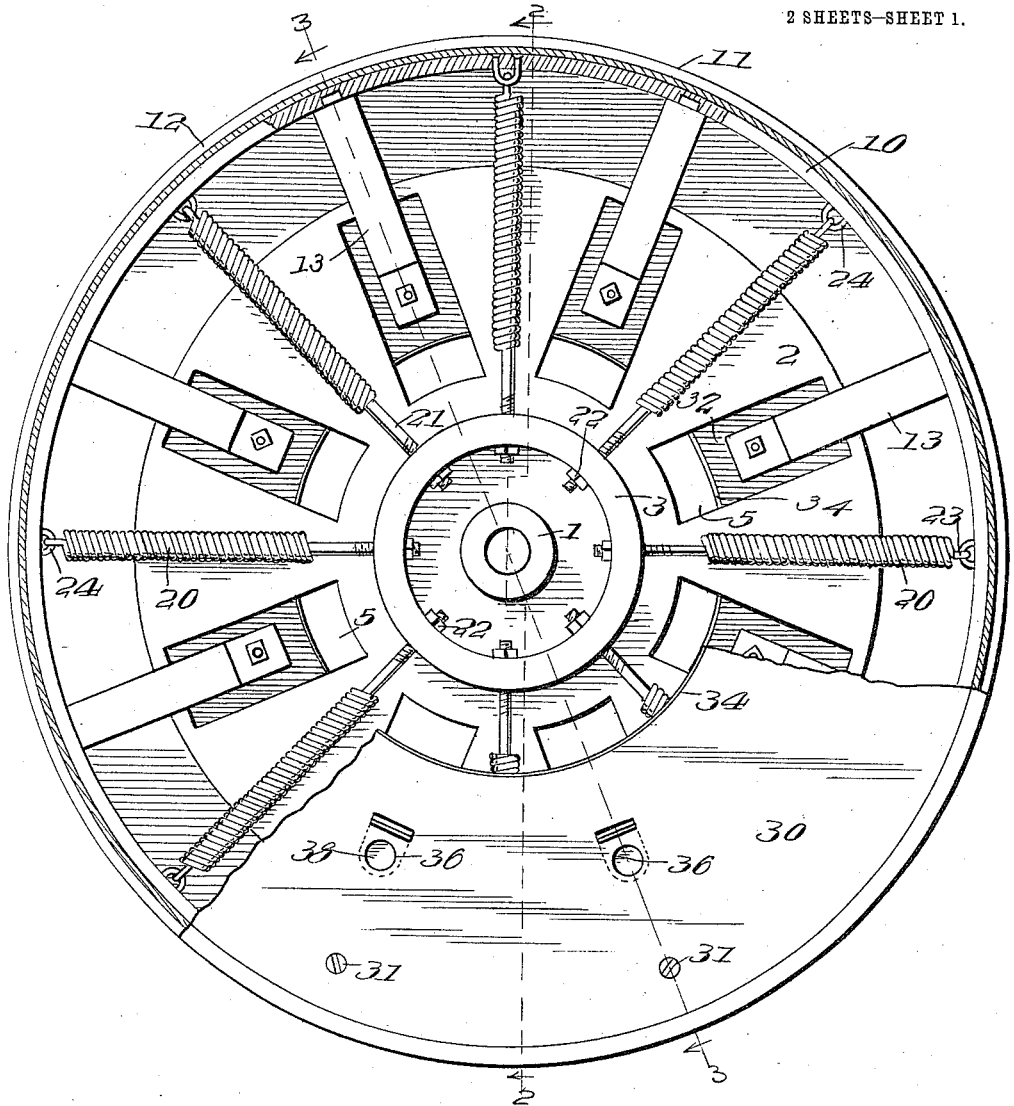

G. F. BARNES & W. A. SUTTLE.
SPRING WHEEL.
APPLICATION FILED MAY 20, 1912.

1,044,973.

Patented Nov. 19, 1912.

2 SHEETS—SHEET 1.

Witnesses

Inventors
George F. Barnes and
W. A. Suttle,
by
Attorneys

G. F. BARNES & W. A. SUTTLE.
SPRING WHEEL.
APPLICATION FILED MAY 20, 1912.

1,044,973.

Patented Nov. 19, 1912.
2 SHEETS—SHEET 2.

Witnesses

Inventors
George F. Barnes and
W. A. Suttle,
by H. B. Willson & Co.
Attorneys

UNITED STATES PATENT OFFICE.

GEORGE F. BARNES AND WILLIS A. SUTTLE, OF FREESTONE, TEXAS.

SPRING-WHEEL.

1,044,973.  Specification of Letters Patent.  Patented Nov. 19, 1912.

Application filed May 20, 1912. Serial No. 698,532.

*To all whom it may concern:*

Be it known that we, GEORGE F. BARNES and WILLIS A. SUTTLE, citizens of the United States, residing at Freestone, in the county of Freestone and State of Texas, have invented certain new and useful Improvements in Spring-Wheels; and we do declare the following to be a full, clear, and exact description of the invention, such as will enable others skilled in the art to which it appertains to make and use the same.

This invention relates to resilient wheels, and more especially to those in which the resilience is in the wheel itself; and the object of the same is to improve the construction of a spring wheel so that its hub member shall be yieldingly supported by its rim member and may move therein radially and circumferentially without noise. This and other objects are accomplished by the construction hereinafter more fully described and claimed, and as shown in the drawings, wherein—

Figure 2:
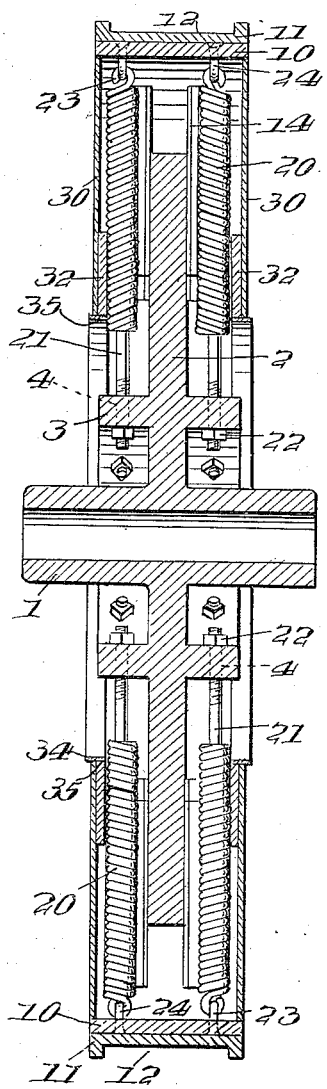
Figure 3:
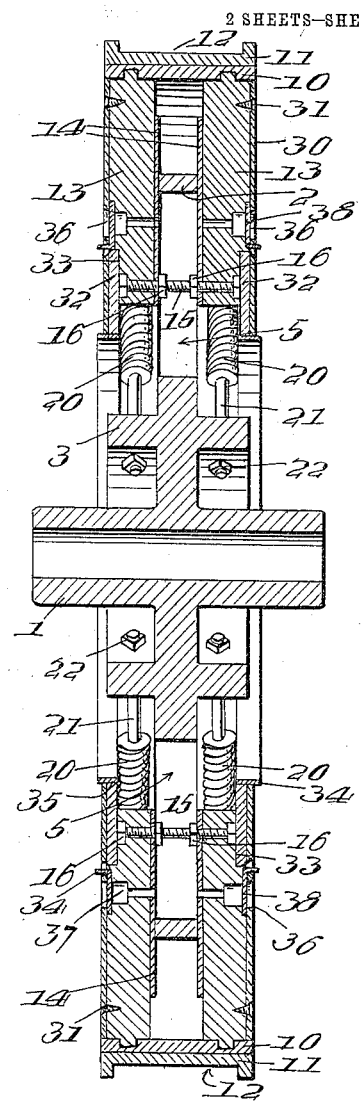

Figure 1 is a side elevation of this improved wheel, with most of the nearer shield removed to show the interior construction; and Figs. 2 and 3 are sections on the lines 2—2 and 3—3 of Fig. 1 respectively.

The hub member of this improved wheel comprises a hub proper numbered 1 in the drawings, a rather large disk 2 surrounding the hub at the center of the length of the latter and made either integral therewith or of separate material attached rigidly thereto, and a flange 3 on each side of the disk, spaced some distance from the hub and projecting from the face of the disk out around the end of the hub for part of the length thereof. The hub will contain ball bearings by which it is mounted on the axle spindle, but these form no part of the present invention and are not illustrated. The flange is pierced with a series of radial holes 4, and through the body of the disk between its outer edge and the outer side of the flange is formed a series of rectangular openings or holes 5 somewhat longer radially of the wheel than circumferentially thereof and disposed on lines midway between the holes 4 as shown.

The rim member of this improved wheel comprises a felly 10 which may itself be a metal band channeled for the reception of the tire or may carry a separate rim 11 having channels 12 for the tire, the rim being attached to the felly by means not necessary to illustrate and the tire also being omitted from the drawings; a series of spokes 13 arranged in pairs having tenons at their outer ends located in the felly 10, having their bodies passing inward astride the outer edge of the disk 2 over the openings 5 therein, having wear plates or cushions 14 carried by their inner faces so as to make contact with said disk over the outer ends of the openings 5, and having bolts 15 connecting their inner ends. Each bolt has the usual head and three nuts 16 so that by adjusting the same the exact position of the inner ends of the pairs of spokes may be regulated to cause the cushions to contact with the disk 2 sufficiently to guide the spokes thereover without rattling and yet without binding. Between the spokes are disposed pairs of springs 20, the members of each spring standing astride the disk 2 but out of contact with it, and the inner end of each spring has a rod 21 passing through one of the holes 4 in the flange 3 and receiving a nut 22 at its inner end, while the outer end of the spring has a hook 23 engaging a staple or eye 24 projecting from the inner face of this felly 10. Thus it will be seen that the rim member is connected with the hub member by means of the spokes, the bolts at their inner ends passing loosely through the large openings, and the adjustable springs.

A protecting shield is by preference employed at each side of this wheel to keep dust, moisture, and other obstructions out of the mechanism, and the same consists of a wide sheet metal ring 30 preferably attached by screws 31 to the spokes as shown; and by preference the inner edge of the shield 30 is reinforced by an annulus 32 standing between the inner face of the shield and the adjacent faces of the spokes which latter are recessed at 33 to admit the annulus. When the annulus is applied, the inner edge of the shield, around its large central opening, may be provided with a flange 34 turned inward toward the disk and secured at 35 to the inner edge of the annulus. At proper points the shield is pierced with openings 36 and the spokes with registering openings 37 through which lubricant may be inserted from time to time so as to prevent the cushions from wearing upon the disk and making an unpleasant noise in the movements of this wheel, and the outer ends of the openings 36 may be closed by any suitable means such as the plates 38.

We abstain from giving the proportions and materials of parts, and as above stated we have omitted more than a passing reference to the ball bearings within the hub and the tire around the rim of the wheel as these features form no part of the present invention. Weight upon the axle is communicated to the hub proper and by it to the springs at the top of the wheel by which in turn it is communicated to the upper side of the rim, while the entire hub member will probably drop slightly within the rim member and the axis of the hub will stand a little below the true axis of the felly. If this wheel be used as one of the drivers on an automobile or the like, when power is applied to the hub this member will move slightly within the rim member, but if the torsion becomes excessive each of the bolts connecting the inner ends of a pair of spokes will slide toward the rear side of one of the openings 5 so that further relative movements of the hub- and rim-members in this direction will be impossible, while still permitting relative radial movements thereof; and this we consider an important feature of our invention. The nuts at the inner ends of the rods by which the springs are connected with the flange afford means for permitting the adjustment of the tension of any spring or springs so that the members of this wheel may be centered one within the other. The several nuts upon the cross bolts connecting the inner ends of the spokes in pairs afford means for adjusting said inner ends so that the cushions will contact with the side faces of the disk with just sufficient force to prevent lateral play between the members of this wheel, and thereby avoid the danger of its being buckled.

What is claimed as new is:—

1. In a spring wheel, the combination with a hub, and a radial disk secured around the hub and having rectangular openings through its body; of a felly, a series of spokes arranged in pairs secured at their outer ends within said felly and having their inner ends closely fitting astride the outer edge of said disk and passing over the openings therein, cushions carried by the contiguous faces of the spokes of a pair and contacting with said disk, bolts parallel with the axis of the wheel and connecting the inner ends of said spokes in pairs through said openings, each bolt having a head and three nuts for the purpose set forth, and a series of springs arranged between the pairs of spokes and connecting the felly with said disk.

2. In a spring wheel, the combination with a hub member comprising the hub proper, a radial disk secured around the hub at the midlength of the latter and having rectangular openings through its body, and flanges projecting from both sides of said disk and spaced from the hub-ends; of a rim member comprising the felly, a series of spokes arranged in pairs secured at their outer ends within said felly and having their inner ends passing astride the outer edge of said disk over the openings therein, bolts parallel with the axis of the wheel and connecting the inner ends of said spokes in pairs through said openings, each bolt having a head and three nuts for the purpose set forth, and a series of springs arranged in pairs between the pairs of spokes and each connecting the felly with one of said flanges.

3. In a spring wheel, the combination with a hub, a radial disk secured around the same and having flanges at both sides surrounding the hub, a felly, springs connecting the same with said flanges and arranged in pairs at opposite sides of said disk, spokes also arranged in pairs at opposite sides of the disk and disposed between the springs, the spokes being connected at their outer ends with said felly, and cushions carried by the contiguous faces of the spokes of a pair and contacting with said disk; of annular shields secured within the felly at opposite edges thereof and overlying the spokes, said spokes and the shields being provided with registering openings, and means for closing the latter from the exterior.

4. In a spring wheel, the combination with a hub, a radial disk secured around the same, the felly, spokes arranged in pairs projecting inward from said felly astride the outer edge of the disk, each spoke being recessed in its outer face, and springs arranged in pairs connecting the felly with the hub between the spokes; of two shields, each consisting of a wide sheet metal ring secured within the felly and overlying the spokes, and an annulus carried by each shield and engaging the recesses in the series of spokes.

In testimony whereof we have hereunto set our hands in presence of two subscribing witnesses.

GEORGE F. BARNES.
WILLIS A. SUTTLE.

Witnesses:
J. J. SEALE,
J. R. LAMBERTH.

---

Copies of this patent may be obtained for five cents each, by addressing the "Commissioner of Patents, Washington, D. C."